United States Patent [19]
Landry et al.

[11] Patent Number: 5,561,883
[45] Date of Patent: Oct. 8, 1996

[54] TANK CLEANING SYSTEM USING REMOTELY CONTROLLED ROBOTIC VEHICLE

[76] Inventors: Kenneth C. Landry; Paul Borg, both of 2450 S. Shore Blvd., Ste. 210, League City, Tex. 77573

[21] Appl. No.: 306,706

[22] Filed: Sep. 15, 1994

[51] Int. Cl.⁶ ........................................... B08B 9/08
[52] U.S. Cl. ................... 15/302; 15/304; 15/321; 15/322; 15/339; 15/340.1
[58] Field of Search ............... 15/321, 322, 339, 15/340.1, 304, 302

[56] References Cited

U.S. PATENT DOCUMENTS

| | | | |
|---|---|---|---|
| 3,952,361 | 4/1976 | Wilkins | 15/320 X |
| 4,675,935 | 6/1987 | Kasper et al. | 15/319 |
| 5,072,487 | 12/1991 | Walton | 15/406 |
| 5,205,174 | 4/1993 | Silverman et al. | 15/321 X |
| 5,311,641 | 5/1994 | Matsuura et al. | 15/406 |
| 5,317,782 | 6/1994 | Matsuura et al. | 15/340.1 X |

OTHER PUBLICATIONS

"Wet–Vac Crudbuster", Popular Mechanics, Jun. 1993, p. 18.

*Primary Examiner*—Chris K. Moore
*Attorney, Agent, or Firm*—William J. Beard

[57] ABSTRACT

Methods and apparatus are disclosed for cleaning storage containers used in petrochemical or oil refineries. A remotely controllable dual tracked robotic vehicle is placed in a container to be cleaned. A cleaning fluid diluent material is directed against waste material in the container causing a portion of it to form a slurry which is vacuumed out by a nozzle and hose carried by the vehicle. A separator system exterior to the tank processes the removed slurry.

13 Claims, 4 Drawing Sheets

TANK CLEANING SYSTEM USING REMOTELY CONTROLLED ROBOTIC VEHICLE

BACKGROUND OF THE INVENTION

This invention relates to the cleaning of storage tanks used in petrochemical plants or oil refineries, and more particularly, to systems for removing waste materials which accumulate over time in such tanks.

In the petroleum refining and petrochemical chemical industries large storage tanks are in common usage. Various processes cause waste materials, both solid and liquid, to be generated along with the desired products. The accumulation of such waste materials, or sludge, can occur in these large storage tanks. It is not uncommon to have several feet of such sludge in the bottom of a single such large storage tank. The sludge usually contains a fairly high percentage of hydrocarbon which can be recycled if separated from the solid irreducible waste which may comprise catalyst fines, rust or other particulate matter developed in a particular chemical process.

In the prior art heated diluent such as diesel fuel or light crude oil or water is directed by a central manifold or by hand held hose inside a storage tank against the sludge therein. This can convert the sludge into a pumpable slurry which is then pumped from the tank and further treated to separate out reusable hydrocarbons and recycle the diluent while discarding the solid waste. It was also proposed in U.S. Pat. No. 4,817,653 to use a waste washing robot operated by a human operator positioned inside the tank to spray water under pressure against tank residue to cause dislodgment of the sludge or other waste.

In practicing such cleaning techniques it has heretofore been necessary to have an observer in line of sight of the point of application of the water or heated diluent order to control this portion of the process. This has necessitated humans inside the tank being cleaned. Workers can thus be exposed to $H_2S$, benzene or other potentially poisonous or highly volatile atmospheres. In the present invention this potentially dangerous exposure is eliminated through the use of robotic, remote controlled, devices operable from a safe distance from the tank. The extremely labor intensive, dangerous, work by humans inside of tanks being cleaned is virtually eliminated by the system of the present invention.

SUMMARY OF THE INVENTION

In the system of the present invention water or heated diluent is directed against tank sludge inside a tank being cleaned by a dual tracked, remote controlled robotic vehicle. An on board lighting system and a video camera on this robotic vehicle enable an operating technician located a safe distance away in a comfortable climate controlled portable building to operate the robotic vehicle, to direct a nozzle for a diluent or water, to the proper operating angle or position against the sludge, to operate an evacuation nozzle to pump out slurry created by the heated diluent or water, and to monitor $H_2S$, $O_2$ and LEL (LOWER EXPLOSIVE LIMIT) levels inside the tank. A microphone for audio monitoring may also be included on the robotic vehicle if desired. The robotic vehicle is hydraulically powered via an umbilical cable/hose and has a dual track drive system made of bronze plates covered with hard rubber to prevent sparking. A constant ground fault interrupter switch on the control unit alerts the operator if static dissipation grounding is lost. The robotic vehicle breaks down into modules which may easily be passed through a standard 24 inch diameter manway to the interior of the tank to be cleaned. Inside the tank, the robotic vehicle is reassembled in a very short time and is then capable of operation without human intervention inside the tank. Positioning of the robotic vehicle within the tank is accomplished by the operator observing a second, fixed video monitor connected to a camera positioned at a tank entry port or the like. The slurry produced by the application of the diluent is pumped from the tank and can be treated for separation of solids and hydrocarbons.

The structure and operation of the present invention is best understood by reference to the following detailed description thereof, which is intended as illustrative rather than limitative, when taken in conjunction with the accompanying drawings, wherein:

DETAILED DESCRIPTION OF THE PREFERRED EMBODIMENTS OF THE INVENTION

Figure 1:
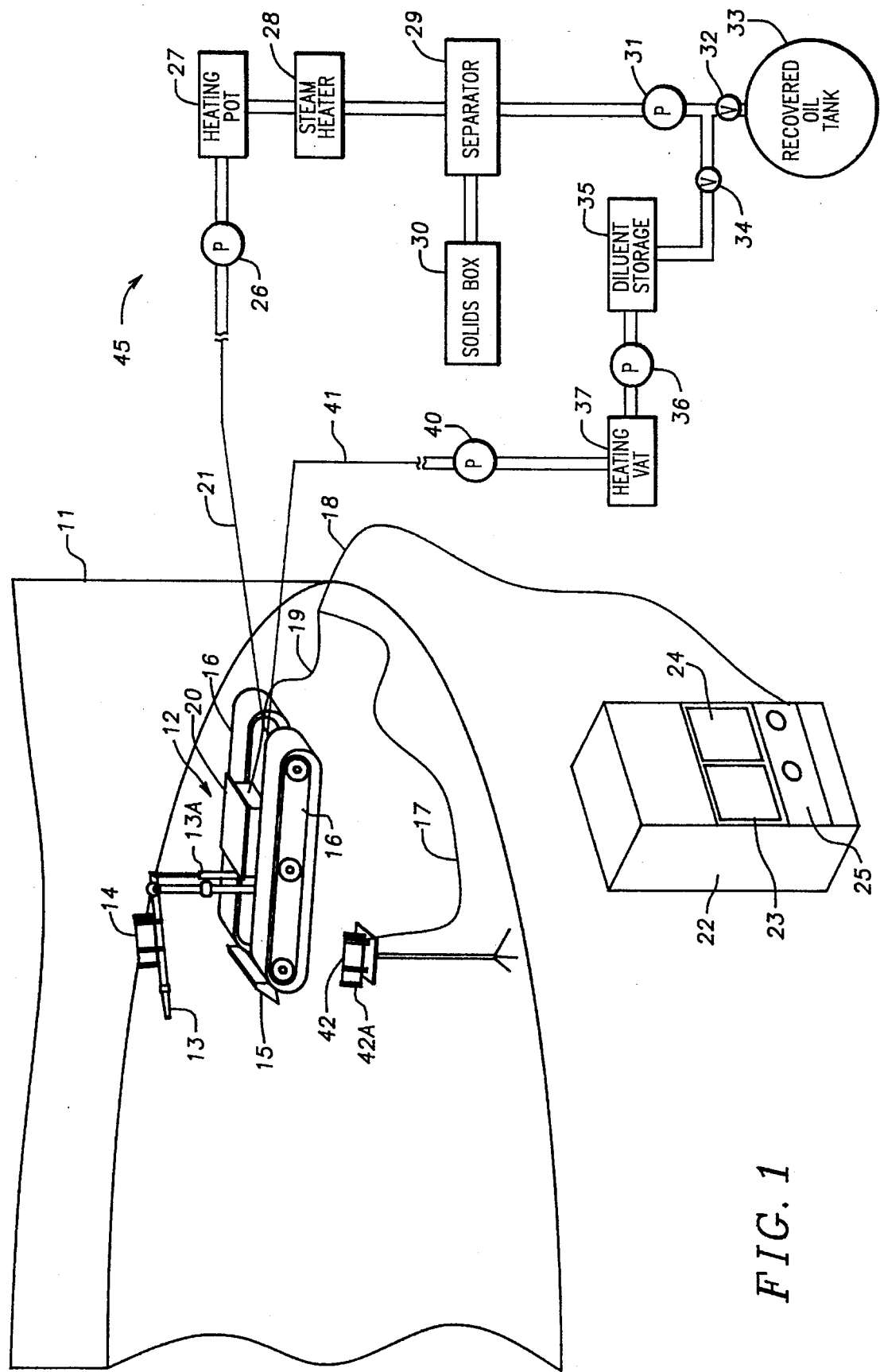
FIG. 1 is a schematic drawing showing an overall system according to concepts of the present invention deployed in tank to be cleaned using heated diluent and schematically showing the processing of the pumpable slurry.

Referring initially to FIG. 1 a tank cleaning system employing generally the concepts of the present invention is shown schematically. A dual tracked remote controlled robotic vehicle, shown generally at 12, is deployed inside a tank 11 to be cleaned. The vehicle 12 is attached to a remotely located control console 22 via an umbilical hose/cable 18, 19, 17, to a diluent delivery hose 41, and via an evacuation hose 21, to a slurry processing system shown generally at 45. While illustrated here using a heated diluent cleaning system recirculating the diluent, it will be understood that it may be desirable to use pressurized water in some instances. The use of either and the use of other separation and recirculation systems is contemplated to be within the scope of the invention. The vehicle 12 has dual caterpillar type tracks 16 comprising hard rubber covered bronze segments which are hydraulically powered with hydraulic fluid from a conventional external hydraulic power pack (not shown) which supplies the hydraulic fluid under pressure to a hydraulic manifold 20. The vehicle 12 is also provided with a slurry suction nozzle 15 on its front end which is also hydraulically movable to an up or down position via the hydraulic manifold 20 and an actuator.

Similarly a cannon nozzle 13 which is movable under the power of a hydraulic actuator 13A is attached to the hydraulic manifold 20. A video camera and a light source 14 are attached to the nozzle 13 so that video signals therefrom may be monitored at the control console video monitor screen 24 via the umbilical cable/hose 18, 19. A second video monitor screen 23 on the control console 22 is provided with video signals from a separate fixed mounted video camera 42 and light source 42A via umbilical cable/hose 17,18. The control console 22 is provided with a control panel 25 which contains appropriate controls and switches, which will be discussed in more detail later, for controlling the operation of the vehicle 12 and camera 42 and light source 42A apparatus from a safe controlled environment, remote location while the vehicle 12 is deployed in the tank to be cleaned.

Heated diluent is supplied via supply hose 41 to the cannon nozzle 13 of the vehicle 12 where it is directed under the remote control via console 22 of an operator against sludge to be removed from the tank 11. The pumpable slurry of solid and liquid including hydrocarbon formed thereby, is pumped via evacuation nozzle 15, evacuation hose 21 and pump 26 to a heating pot 27. Heating pot 27 maintains the pumpability of the slurry which is usually pumped to a location somewhat removed from the tank 11 for further treatment. Separator 29 may comprise, for example, inclined shaker screens to separate out relatively large solid particles and/or a centrifugal separator to separate out finer solid particles. The separated solids are routed to a solids box 30 for disposal.

Heavier hydrocarbons are pumped from the separator 29 via pump 31 and valve 32 into a recovered oil tank 33. The lighter hydrocarbons and diluent are pumped via pump 31 and valve 34 into the diluent storage tank 35 where they may be recycled in the tank cleaning process. A pump 36 pumps diluent from the storage tank 35 to a heating vat 37 where it is heated to a temperature approximately 20° F. below its lowest flash point. It is then pumped via a pump 40 and the umbilical hose 41 to the cannon nozzle 13 as previously described.

Figure 2:
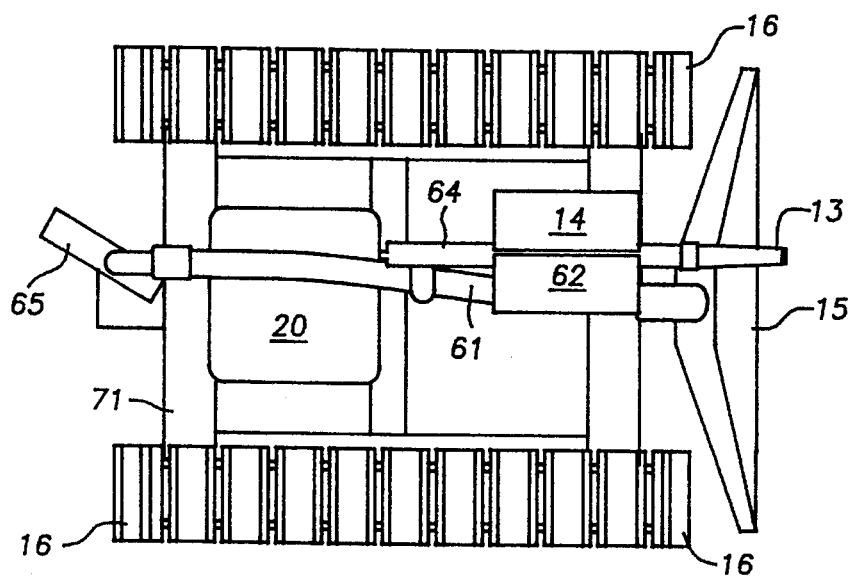
FIG. 2 is a schematic top view of the tracked robotic vehicle of FIG. 1.
Figure 3:
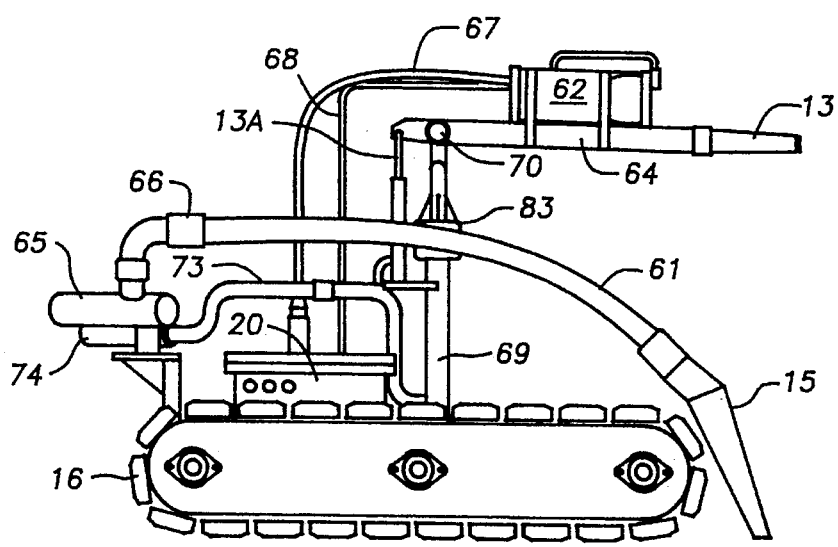
FIG. 3 is a schematic side view of the tracked robotic vehicle of FIG. 1.
Figure 4:
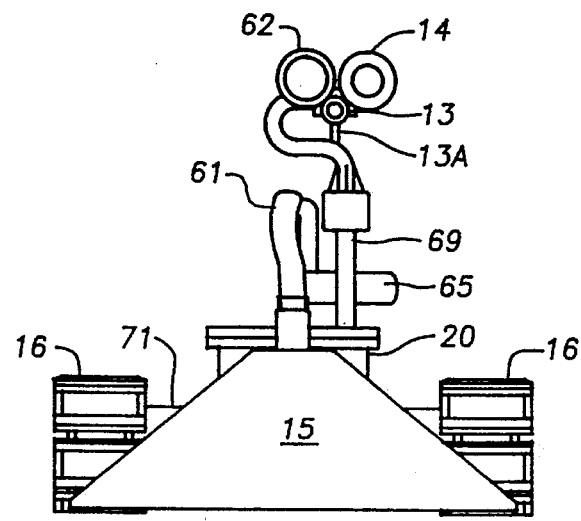
FIG. 4 is a schematic front view of the tracked robotic vehicle of FIG. 1.

Referring now to FIGS. 2, 3 and 4, the vehicle 12 of FIG. 1 is shown in somewhat more detail in a top view, a side view and a front view respectively. A vehicle body platform 71 is provided with dual caterpillar tracks 16, one on each side, and which are independently hydraulically operable as will be discussed in more detail subsequently. The body platform 71 supports an upright stanchion 69 and a hydraulic control manifold 20. The manifold 20 is supplied with hydraulic fluid under pressure from the umbilical cable/hose 18, 19 (FIG. 1). The manifold 20 houses plural solenoid activated hydraulic valves to be discussed with respect to FIGS. 5 and 6.

Stanchion 69 supports a pivot 70 mounted supply pipe 64 which supplies heated diluent via connector pipe 73 and umbilical cable/hose 18, 19 (FIG. 1) and via hose connector 74 (FIG. 2). The supply pipe 64 is pivotally mounted at 70 and supplies the diluent to nozzle 13 which is positioned by a hydraulic actuator 13A mounted on platform 71. The nozzle 13 may be positioned by the remote operator to deliver diluent where desired.

The delivery of the diluent via nozzle 13 is monitored by video camera 14 and light source 62 which are fixedly strapped to the supply pipe 64. Thus the camera 14 always tracks and points in the general direction of the nozzle 13 and the effect of the delivered diluent on the sludge may be viewed by the operator. A microphone on the camera can provide audio monitoring of diluent delivery to the operator.

This heated diluent is provided at a relatively low pressure of a few hundred PSI, the object being to break up the solid sludge and to form a pumpable slurry with it which is then picked up and pumped away via evacuation nozzle 15. If water usage is contemplated, rather than diluent the vehicle 12 systems and nozzle 13 are fully capable of handling higher pressures for fluid delivery if desired. Evacuation nozzle 15 is connected via evacuation pipe 61 and pipe fitting 66 to evacuation hose fitting 65 which is connected to outlet line 21 (FIG. 1) for slurry processing as previously discussed.

Figure 5:
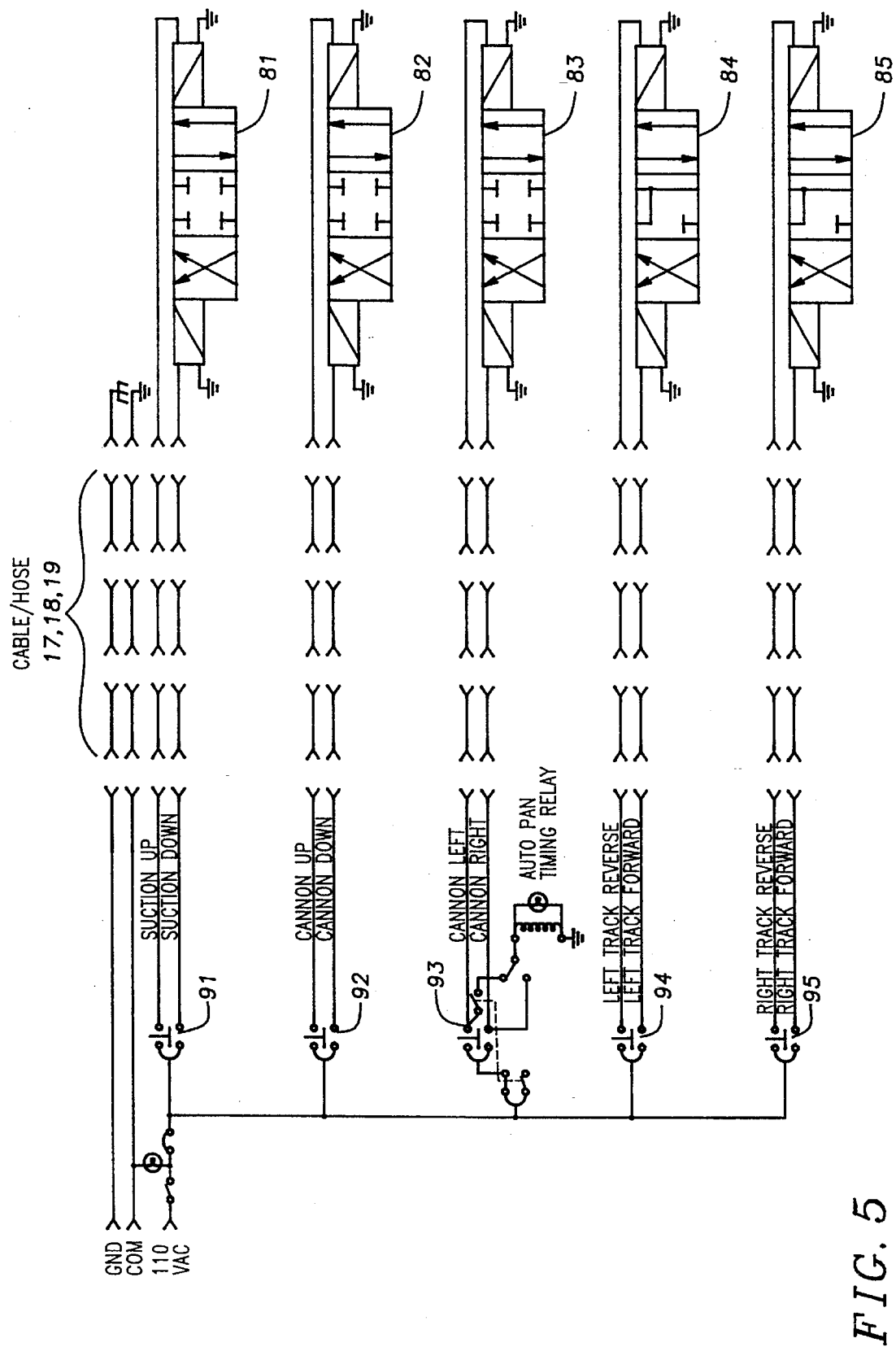
FIG. 5 is a schematic hydraulic and wiring diagram of a portion of the system shown in FIG. 1 for controlling the cannon nozzle, the vehicle tracks, and the slurry suction nozzle.
Figure 6:
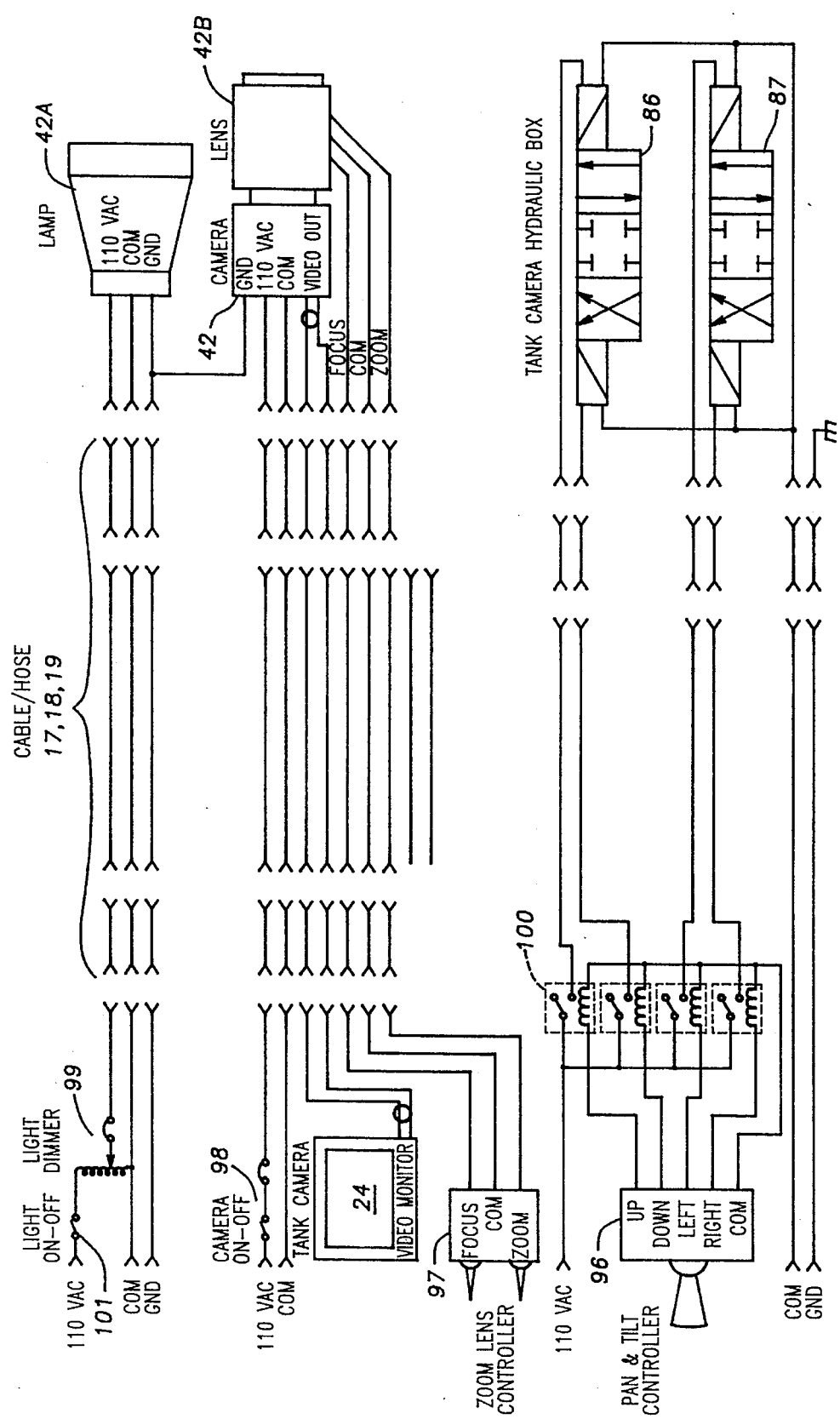
FIG. 6 is a schematic hydraulic and wiring diagram of a portion of the system of FIG. 1 for controlling the robotic vehicle lights and video camera equipment.

Referring now to FIGS. 5 and 6 schematic electrical/hydraulic control diagrams are illustrated. Electric solenoidally activated hydraulic valves 81–87 of FIGS. 5 and 6 are located in the hydraulic manifold box 20 of FIGS. 1–4 on the vehicle platform 71. This provides an explosion proof system in the event of spark generation. Control switches 91–99 are all mounted on the control console 22 (FIG. 1) and are connected to lamps 42A and 62, cameras 42 and 14, and hydraulic manifold 20 on the vehicle via control cable/hose 17,18, 19 (FIG. 1).

For example control switch 91 on console 22 in one position (up) provides current to solenoid activated hydraulic valve 81 to position a hydraulic activator (not shown) controlling evacuation nozzle 15 to the up position. In its opposite position switch 91 lowers nozzle 15 to its down position.

Similarly, switch 92 in one position supplies current to solenoid operated hydraulic valve 82 to move hydraulic actuator 13A (FIG. 1) up to lower nozzle 13 about its pivot point. In the opposite position switch 92 moves actuator 13A down and nozzle 13 up similarly operating via hydraulic valve 82 and cable/hose 18, 19.

Switch 93 in one position supplies current to solenoid actuated hydraulic valve 83 to move a hydraulic actuator (not shown) left or right to direct pivotally mounted nozzle 13 in this manner.

Similarly switches 94 and 95 in their first positions supply current to solenoid actuated hydraulic valves 84 and 85 to drive each of the two tracks 16 of the vehicle independently, either forward or reverse direction as shown in FIG. 5. By moving one track forward or reverse independently of the other track, the vehicle may be backed up or moved forward or turned left or right as desired. A joystick controller (not shown) which operates in a manner similar to that of joystick controller 96 (FIG. 6) can be used to control the track 16 drive of the vehicle 12. This controller can be located on control panel 22 as desired.

Referring to FIG. 6 a pan and tilt controller joystick 96 is connected to a set of relays 100 in such a manner that relays 100 supply current to solenoid operated hydraulic valves 86 and 87 via cable/hose 18, 17 to drive a pair of hydraulic actuators (not shown) which can move fixed video camera 42 about its vertical and longitudinal axes. This enlarges the field of view of the fixed camera 42 which monitors the location of the robotic vehicle 12 inside the tank.

A zoom lens controller switch 97 supplies signals to zoom lens 42B on camera 42 via cable/hose 17, 18 to cause the zoom lens 42B to change its magnification factor. Thus the monitoring of the effect of diluent or water from nozzle 13 may be monitored at whatever magnification is desired. A camera on/off control 98 is similarly connected via cable/hose 18, 19 to the camera 42 (FIG. 1). Lens washer systems for the lenses of cameras 14 and 42 are also supplied which direct clear water across these lenses to wash away any accumulation of debris which could obscure their view. The lens washers are switch controlled from the control panel 25.

A light on/off control 101 and dimmer variac 99 are connected via cable/hose 18, 17 (FIG. 1) to control the brightness of light source 42 associated with camera 42 in the manner shown in FIG. 6. Optimal brightness level for a given camera magnification factor may thus be controlled. It will be understood that vehicle mounted camera 14 can be similarly controlled from the control panel 25 as described with respect to fixed camera 42.

In operation, the system of the present invention can be operated 24 hours a day using shifts of operators to clean tanks quickly. Jobs that using manned equipment, would take months to perform become possible to perform in a matter of merely days. Safety of operating personnel in greatly enhanced. If desired the control console 22 can be provided with VHS video tape recorders to record the views of camera 14 and 42. Such tapes can be used for monitor purposes at a later time or for the training of operators in the use of the system.

The foregoing descriptions may render changes and modifications to the system obvious to those of skill in the art. The aim of appended claims is to cover all such modifications as fall within the true spirit and scope of the invention.

We claim:

1. A system under control of an operator for cleaning waste material, or sludge, having a solid phase and a liquid phase from a container comprising:
    (a) a source of cleaning fluid for supply to a directionally controllable nozzle carried by;
    (b) a remotely controllable movable robotic vehicle, said vehicle being controllable from outside a direct line of sight of an operator, said movable robotic vehicle capable of directing a stream of said cleaning fluid onto said waste material in an amount sufficient to cause a flow of at least a portion thereof; and
    (c) said vehicle having an evacuation nozzle and hose capable of evacuating at least a portion of said liquid phase and said flow of said waste material exteriorly to said container.

2. The system of claim 1 wherein said remotely controllable vehicle further comprises:
    means for video monitoring of the location in said container at which said stream of said cleaning fluid is directed, said monitoring means located at the location of said remote control exterior to said container.

3. The system of claim 2 and further including:
    means, under operator control, for changing the direction of said stream of cleaning fluid in response to said video monitoring of said stream.

4. The system of claim 3 and further including:
    means, under operator control, for moving said remotely controllable vehicle in response to said video monitoring of said stream and the location of said vehicle in said container as monitored by a second video monitoring means.

5. The system of claim 4 wherein said remotely controllable vehicle comprises a dual tracked, hydraulically powered vehicle carrying a video camera and a light source each of which are remotely controllable.

6. A remotely controllable movable robotic vehicle sized and adapted for passage in a storage tank containing waste sludge to be removed, comprising:
    a) dual hydraulically powered tracks separately powered and remotely controllable and attached to either side of a vehicle body platform;
    b) cannon nozzle means for directing flow of a cleaning fluid in a desired direction;
    c) video camera means attached to said nozzle for remotely observing the effect of said directed flow of cleaning fluid on said sludge;
    d) controllable light source means for illuminating the region generally of the direction of flow of said cleaning fluid; and
    e) evacuation nozzle means attached to said vehicle and remotely controllable and movable therewith to pick up and remove a pumpable slurry of said sludge and said cleaning fluid from the storage tank.

7. The vehicle of claim 6 wherein all electrical components are contained in explosion proof containers to prevent spark generation.

8. The vehicle of claim 7 wherein said camera means magnification factor is remotely controllable.

9. The vehicle of claim 8 wherein the brightness of said light source is remotely controllable.

10. The vehicle system of claim 9 and further including a second separate remotely controllable video camera and a second remotely controllable light source at a fixed location in said tank for monitoring the position of said movable vehicle in said tank.

11. The vehicle system of claim 10 wherein said second separate video camera has a remotely controllable magnification factor.

12. The vehicle system of claim 11 wherein said second light source brightness is remotely controllable.

13. The vehicle system of claim 12 and further including means carried on said vehicle for monitoring the lowest explosive level of gas fumes in said tank.

* * * * *